United States Patent
Santharam et al.

(10) Patent No.: US 7,756,255 B1
(45) Date of Patent: Jul. 13, 2010

(54) METHOD AND SYSTEM FOR DELIVERING A VOICE MESSAGE FROM A TELEPHONE TO A GROUP OF RECIPIENTS

(75) Inventors: Arun Santharam, Overland Park, KS (US); Thomas M. Sladek, Overland Park, KS (US); Charles E. Woodson, Peculiar, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1347 days.

(21) Appl. No.: 10/853,386

(22) Filed: May 25, 2004

(51) Int. Cl.
*H04M 1/64* (2006.01)
*H04M 1/00* (2006.01)
*H04M 3/42* (2006.01)

(52) U.S. Cl. .................. 379/69; 379/88.17; 379/88.22; 379/355.04; 455/414.1

(58) Field of Classification Search .............. 379/88.22, 379/69, 88.17
See application file for complete search history.

(56) References Cited

U.S. PATENT DOCUMENTS

| | | | |
|---|---|---|---|
| 6,075,844 A * | 6/2000 | Goldberg et al. ......... 379/88.17 |
| 6,201,814 B1 * | 3/2001 | Greenspan .................. 370/428 |
| 6,327,475 B1 * | 12/2001 | Fujimori et al. ............. 455/458 |
| 6,330,308 B1 * | 12/2001 | Cheston et al. .......... 379/88.04 |
| 6,430,604 B1 * | 8/2002 | Ogle et al. .................. 709/207 |
| 6,483,899 B2 * | 11/2002 | Agraharam et al. ...... 379/88.14 |
| 6,507,643 B1 * | 1/2003 | Groner ................... 379/88.14 |
| 6,778,644 B1 * | 8/2004 | Jenkins et al. ........... 379/88.18 |
| 6,873,687 B2 * | 3/2005 | Smith, II ................. 379/88.14 |
| 6,947,528 B1 * | 9/2005 | Ko et al. .................. 379/88.17 |
| 6,990,179 B2 * | 1/2006 | Merrow et al. ................ 379/69 |
| 7,016,938 B1 * | 3/2006 | Quine ........................ 709/206 |
| 7,133,687 B1 * | 11/2006 | El-Fishawy et al. ......... 455/466 |
| 7,200,209 B1 * | 4/2007 | Kim ........................ 379/88.25 |
| 7,283,154 B2 * | 10/2007 | Shachar et al. ........... 348/14.08 |
| 7,317,788 B2 * | 1/2008 | Caspi et al. .............. 379/88.13 |
| 7,363,029 B2 * | 4/2008 | Othmer ................... 455/414.4 |
| 7,372,947 B1 * | 5/2008 | Messmer ................. 379/88.01 |
| 7,570,746 B2 * | 8/2009 | Takeda et al. ............ 379/88.04 |
| 2002/0031206 A1 * | 3/2002 | Matsunsami ............... 379/67.1 |

* cited by examiner

*Primary Examiner*—Joseph T Phan

(57) ABSTRACT

There is disclosed a method and system that allows a telephone user to send voice messages to multiple recipients. According to an embodiment, DTMF signals along with a voice message may be sent over a voice call to a network service platform. The voice message may then be delivered to contacts identified in the DTMF signal.

4 Claims, 9 Drawing Sheets

METHOD AND SYSTEM FOR DELIVERING A VOICE MESSAGE FROM A TELEPHONE TO A GROUP OF RECIPIENTS

BACKGROUND

1. Field of the Invention

The present invention relates to telephony communications, and more particularly, to voice messaging systems.

2. Description of Related Art

Electronic communication is becoming an increasingly popular means of communication. In certain situations, it is advantageous to be able to simultaneously communicate the same audible message to a select group of people. An e-mail message sent from a network enabled computer may be sent to multiple e-mail addresses. However, e-mail is not generally configured for transmission of voice streams. Voice messages sent over e-mail may require substantial processing at both the sending and receiving ends. In addition, e-mail is not ubiquitous.

The telephony system (both wireless and landline) has been developed primarily for transmitting voice signals between telephones. However, adequate technology has not been developed for sending voice messages to multiple telephone numbers or network access identifiers (NAIs).

SUMMARY

The disclosure provides a new mechanism to allow delivery of a voice message from a telephone to a group of recipients. In operation, a dual tone multi-frequency (DTMF) signal, representing contact numbers of the recipients, is transmitted through a voice call by the telephone to a network service platform (NSP). Additionally, the voice message is transmitted to the NSP through the voice call. The NSP then decodes the DTMF signal and delivers the voice message to the contact numbers.

According to an exemplary embodiment, a wireless or landline telephone may contain (1) a telephone book having contact entries each defining a respective contact telephone number, and (2) group data that designates one or more groups of contact entries from the telephone book. A user of the telephone could provision the group data on the telephone, through, for example, the use of a setup interface.

In the exemplary embodiment, the telephone will further include a voice instant messaging (IM) application, which can enable delivery of a voice message from the telephone to a group of contacts. In operation, the application may receive a user selection of a given one of the groups, and the application will initiate a voice call to a network service platform and send to the service platform DTMF representations of the contact telephone numbers in the selected group. Further, the user may speak a voice message, which the telephone will transmit to the service platform. Upon receipt of the voice message and the contact telephone numbers, the service platform may then deliver a recording of the voice message to each of the contact telephone numbers (e.g., by placing a call to each contact telephone number and playing out the message when the recipient answers, or by sending the recorded voice message in an e-mail, MMS message or other transport mechanism to the recipient).

Preferably, the selected group of contacts will comprise two or more contact telephone numbers. Thus, the embodiment may operate to effect delivery of a voice message from a telephone to at least two recipients.

Preferably, the telephone will mask out the sound emitted to the user while the telephone sends the DTMF representations of the contact telephone numbers to the service platform, so the user of the telephone will not hear the digits being dialed. As the telephone dials those digits, the telephone may present a "sending" status-message to the user, to inform the user that the telephone is working to deliver the voice message.

Advantageously, at least one embodiment allows a telephone to deliver a voice message to a' buddy-group, so as to interoperate with more conventional packet-based instant messaging systems. For instance, when the service platform receives the voice message and contact telephone numbers, the service platform could convert each contact telephone number to a Session Initiation Protocol (SIP) address and could deliver the voice message to the SIP address in the same way that SIP-based instant messages are regularly conveyed. That way, a message recipient who normally receives SIP-based instant messages could receive the voice message in the same way he or she normally receives instant messages.

Although this summary speaks of specific embodiments, it should not be read to limit the scope of the invention, which is defined by the claims.

DETAILED DESCRIPTION

1. Overview

In an exemplary embodiment, a system is configured to enable a telephone user to send voice messages to a group of contacts. According to the embodiment, the messages would be delivered substantially simultaneously across a telephone network to each member of the group.

Figure 1:
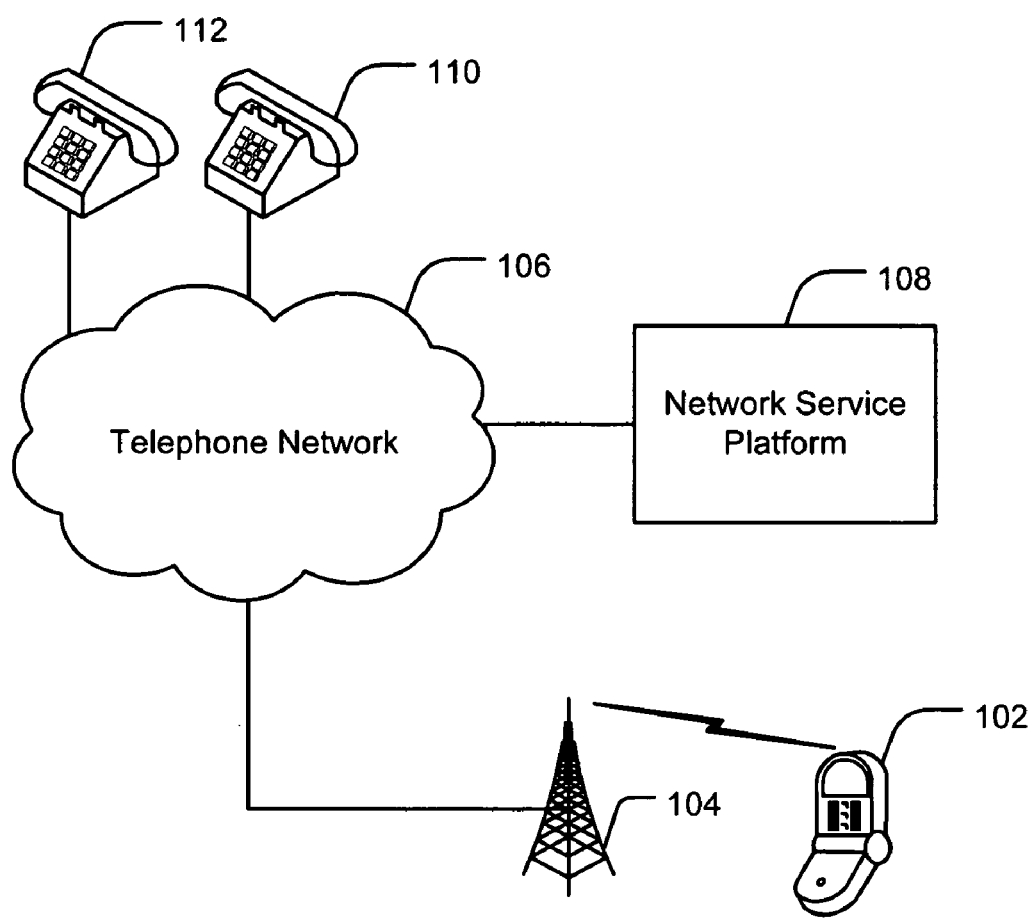
FIG. 1 is a block diagram illustrating network architecture components of an embodiment of the invention.

FIG. 1 provides a block diagram of a simplified network architecture in which an embodiment of the invention can be implanted. A wireless telephone 102 is configured to communicate with a cellular tower 104. The cellular tower 104 is communicatively coupled with a telephone network 106 such as a public switched telephone network (PSTN). Although not shown, the link between the tower 104 and the cellular network may include other nodes such as a base transceiver station (BTS) and a base station controller (BSC). Two landline telephones 110 and 112 are shown coupled with the telephone network 106. A network service platform (NSP) 108 is also coupled with the telephone network 106 and may, for example, be a network server enabled to make and receive voice calls over the telephone network 106.

In this embodiment, the wireless telephone 102 is preconfigured with a group of contacts that includes contact information for potential recipients. In addition, the wireless telephone 102 includes a messaging application for enabling input from the user and for directing communications with a telephony network.

The embodiment further provides that the NSP 108 is configured to receive and process a voice call from the wireless telephone 102. Thus, the NSP 108 may have a processor, telephone circuitry, telephone I/O, and data storage. According to the exemplary embodiment, the data storage on the NSP 108 may include application logic for processing voice calls, decoding dual tone multi-frequency (DTMF) signals, storing a voice message, and sending copies of the voice message to recipients.

The following paragraphs provide an overview of operation of an embodiment where a voice message is sent from the wireless telephone 102 to the landline telephones 110 and 112. In the operation, the wireless telephone 102 places a voice call to the NSP 108 and a connection is established over the telephone network 106. The wireless telephone 102 transmits at least two sets of information to the NSP 108 over the voice call: 1) a set of DTMF signals representing contact numbers and 2) a voice message. According to this simplified example, the contact numbers are the telephone numbers for the two landline telephones 110 and 112.

The NSP 108 decodes the received DTMF signals and places a voice call to each of the contact numbers. DTMF signals can be decoded through analog or digital signal processing. For example, an SS1203 DIP-18 chip made by Silicon Systems, Inc. may be used as a DTMF-receiver chip. After decoding the DTMF signals, the NSP 108 places voice calls by dialing the telephone numbers of the two landline telephones 110 and 112. After a first connection is established with the first landline telephone 110, the NSP 108 transmits the voice message over the first connection. Likewise, after a second connection is established with the second landline telephone 112, the NSP 108 transmits the voice message over the second connection.

Figure 2:
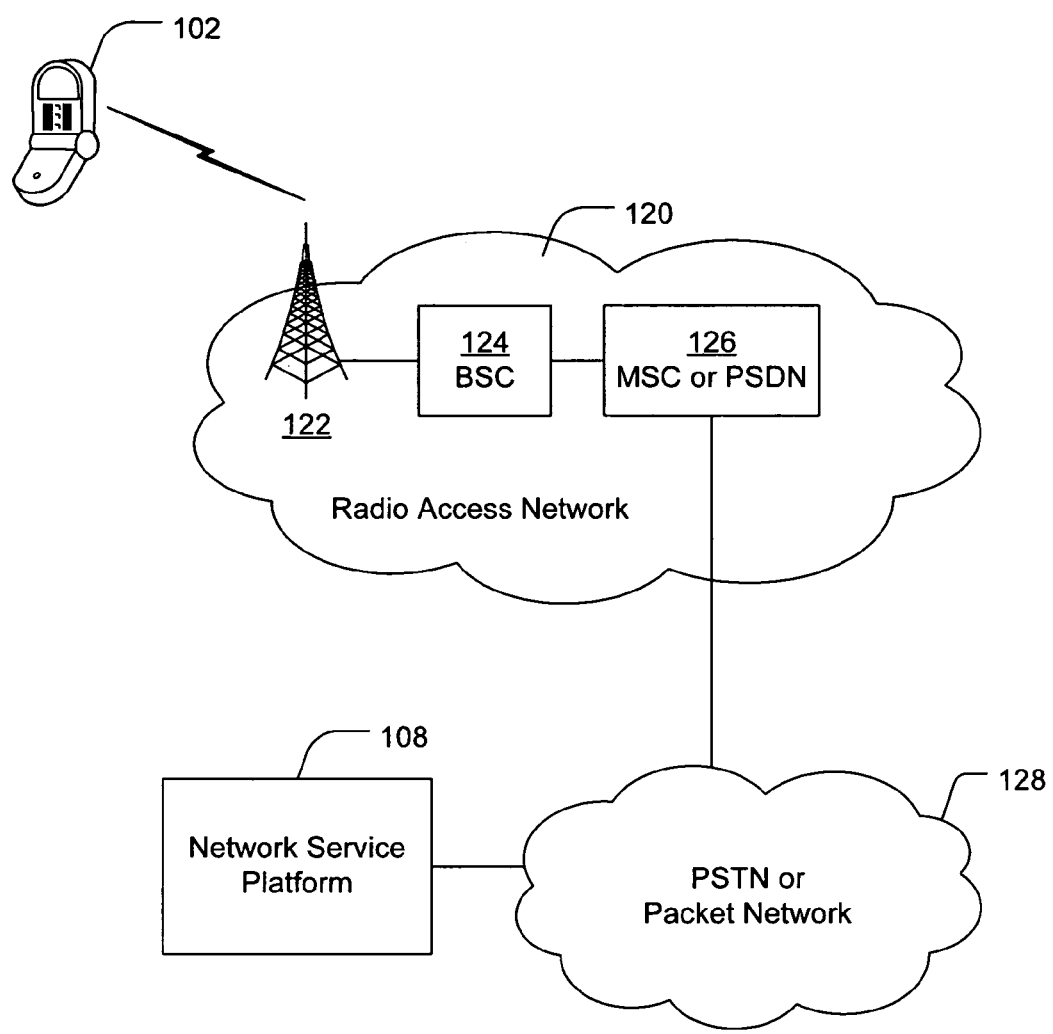
FIG. 2 is a block diagram illustrating network architecture components of a further embodiment of the invention.

A further embodiment of the network architecture is shown in FIG. 2. Wireless telephone 102 is configured to place a voice call to NSP 108 through a radio access network 120 and a PSTN or packet data network 128. The radio access network 120 includes a base transceiver station (BTS) 122 located at a communications tower and coupled with a base station controller (BSC) 124. The BSC 124 is also coupled with a mobile switching center (MSC) or PDSN 126. The wireless telephone may communicate with the radio access network 120 through the BTS 122. Likewise, the PSTN or packet data network 128 may communicate with the MSC/PDSN 126. In operation, a voice call may be dialed at the wireless telephone 102 and connected at the NSP 107 after passing through the described elements.

2. Exemplary Network Architecture

Figure 3:
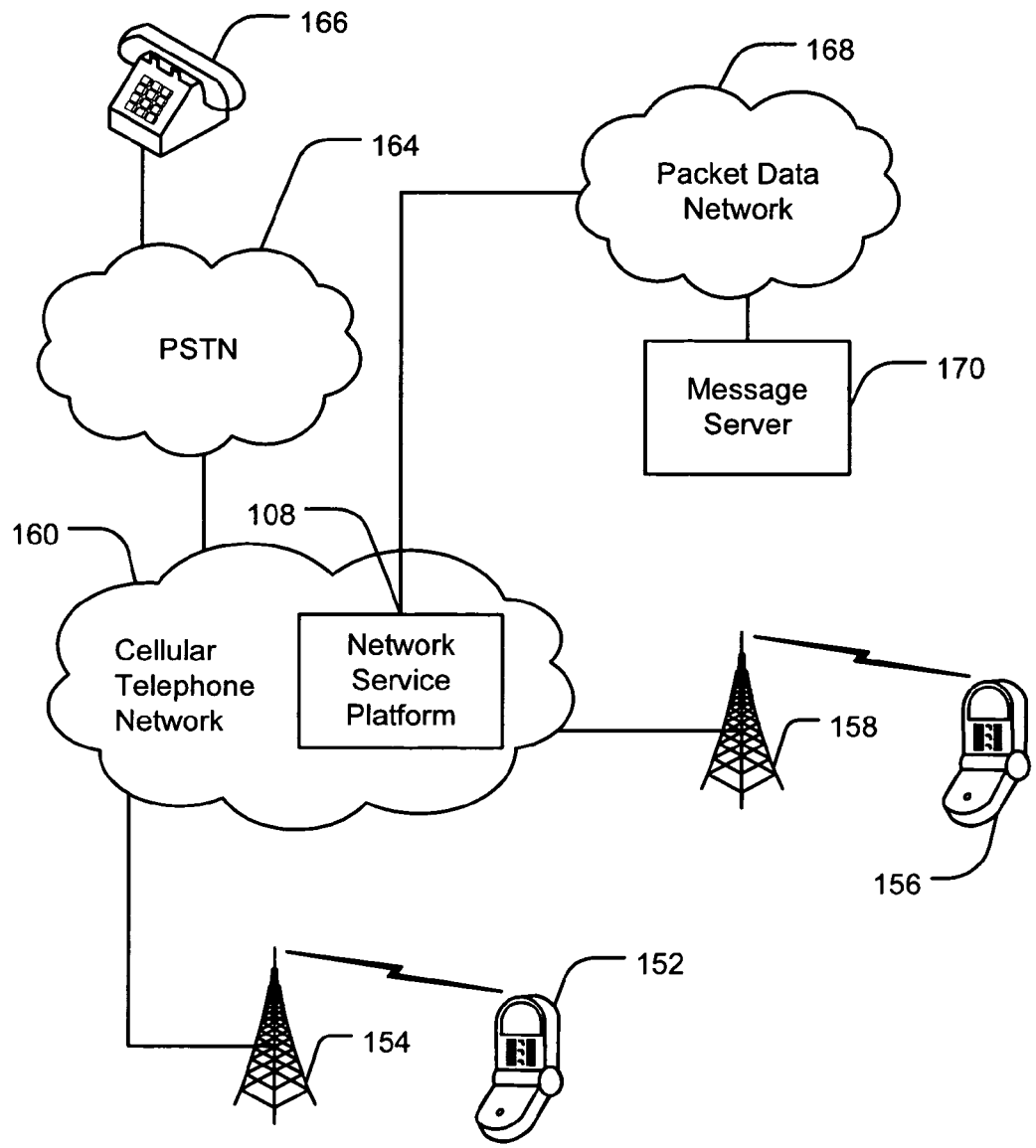
FIG. 3 is a block diagram illustrating network architecture components of another embodiment of the invention.

A network architecture diagram is presented in FIG. 3. Three telephones 152, 156, and 166 are shown. It is contemplated, however, that the network architecture may include any number of telephones. Wireless telephones 152 and 156 are configured to communicate with a cellular telephone network 160 through cell towers 154 and 158 respectively. One skilled in the art will recognize that the communication link between a wireless telephone 152 (for example) and the cellular telephone network 160 may pass through several segments including multiple wireless towers, cells, sectors, and switches. Likewise, the wireless telephone 152 may be a WiFi, Bluetooth®, or IP telephone that is coupled to a telephone network through a packet-switched network including, for example a local-area-network (LAN) and/or wide-area-network (WAN). (Thus, in this application, coupling can include more than simply direct coupling.) A landline telephone 166 is communicatively coupled with the PSTN 164. Likewise, the PSTN 164 is communicatively coupled with the cellular telephone network 160. A network service platform (NSP) 108 is shown within the cellular telephone network. It is anticipated that a cellular carrier may manage the NSP 108 and thus place the NSP within the cellular telephone network. It is contemplated, however, that the NSP 108 may be externally coupled with the cellular telephone network 160. Alternatively, the NSP 108 may be coupled with the PSTN 164, which is in turn coupled with the cellular telephone network 160. Other configurations are possible.

According to an embodiment, the NSP 108 is a server or other computing device with a processor, memory and I/O functionality. However, the NSP 108 may be a distributed apparatus or system occupying various physical locations. For example, the functionality of the NSP 108 may be accomplished by several processors coupled with various data storage facilities. As an example, DTMF processing and decoding may be performed on a first portion of the NSP 108, digital storage of voice messages on a second portion of the NSP 108, and establishing connection with receiver stations on a third portion of the NSP 108. Other breakdowns across functional or other lines are available to those skilled in the art. Likewise, it is contemplated that several NSP's may be used to handle a greater system throughput, for convenience, for load balancing, or for other reasons.

In the embodiment shown in FIG. 3, the NSP 108 is coupled with a packet data network 168. The packet data network 168 may, for example, be an IP network. Thus, the coupling between the NSP 108 and the packet data network 168 may be a packet data connection. The packet data network is coupled with a message server 170. The message server may, for example be an e-mail server, a session initiation protocol (SIP) server, a multimedia messaging service (MMS) server, an instant messaging (IM) server, or other message server with capabilities for delivering messages or establishing a voice connection with a user, customer premises equipment (CPE), or another computing device. The message server 170 may also be configured to interoperate with a packet-based instant message system.

Any of the three telephones 154, 156, 166 could be configured as a sending telephone. Likewise, a VOIP telephone (not shown) attached to the packet data network 168 may be configured as a sending telephone. It is contemplated that any voice-CPE may be a receiving telephone without further modification. Likewise, in some embodiments, the message server 170 may be configured as a receiving telephone.

3. Exemplary Telephone

Figure 4:
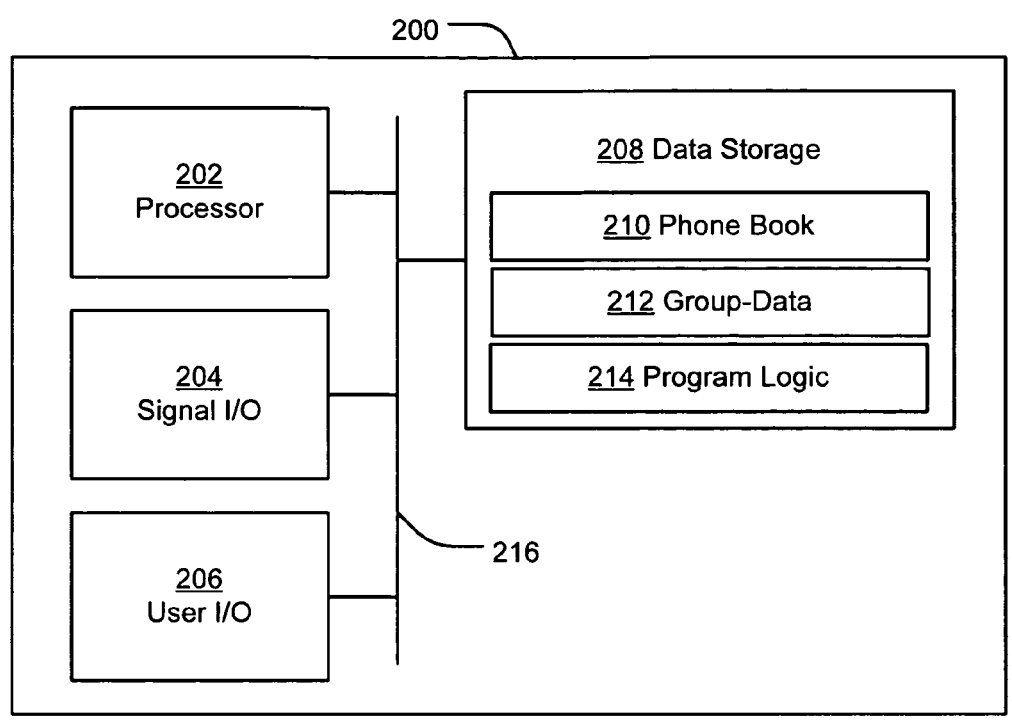
FIG. 4 is a block drawing of a telephone in accordance with an embodiment of the invention.

FIG. 4 provides an illustration of a telephone 200 according to an exemplary embodiment. Various elements are shown as block figures in the drawing. The elements of the telephone 200 are coupled along a bus 216, although other coupling types are available. A processor 202, signal input/output (I/O) 204, user I/O, and data storage are coupled with the bus 216. For brevity, only these few elements are shown. Additional elements may be added or substituted. Likewise, some elements shown may be removed from some embodiments.

The data storage 208 may be logically divided into at least three sections. A first section 210 stores telephone book information. Telephone book information, also known as contact numbers, may include telephone numbers, e-mail addresses, network access identifiers, and other identifying information. A second section 212 stores group-data. Group data may be configured so that a subset of contact numbers is included within a group. The group may be given a name or other identifier. For example, a set of contact numbers for family members may all be included within a group named "family."

Program logic 214 is also stored in data storage 208. According to the exemplary embodiment, program logic is executable by the processor 202 in order to perform functions. These functions may include, for example, interacting with user I/O to update telephone book entries, interacting with user I/O to update group-data entries, interacting with user I/O to obtain a voice message and operational instructions, encoding DTMF (or other tonal) representations of contact numbers, placing a voice call, sending DTMF representations of the contact numbers through the signal I/O 204, sending a voice message through the signal I/O 204, prompting the user with a setup interface through wish the user can establish the data-group, masking sound of the DTMF representations as they are dialed, so that the user cannot hear the DTMF representations being dialed, presenting a status message to the user indicating that the voice message is being delivered, etc. Other functions, including those normally associated with a telephone, are also available to one skilled in the art. The data storage 208 may have other storage space to store, for example, voice messages and non-related information or programs.

The signal I/O 204 may, for example, be a transceiver on a wireless telephone or simply a twisted pair on a landline telephone. Generally, the Signal I/O 204 serves as a node in the link between the telephone 200 and a telephone (or other) network. Likewise, the user I/O may serve to allow a human user to interact with the wireless device. Input mechanisms may include a keypad and voice transducer, for example. Other input mechanisms are available, such as a touch-screen or mouse. The user output portion of the user I/O 206 may include a display, speaker, and other lights or signals. One skilled in the art will recognize that other types of I/O may be used than those briefly described here.

4. Exemplary Operation

Figure 5:
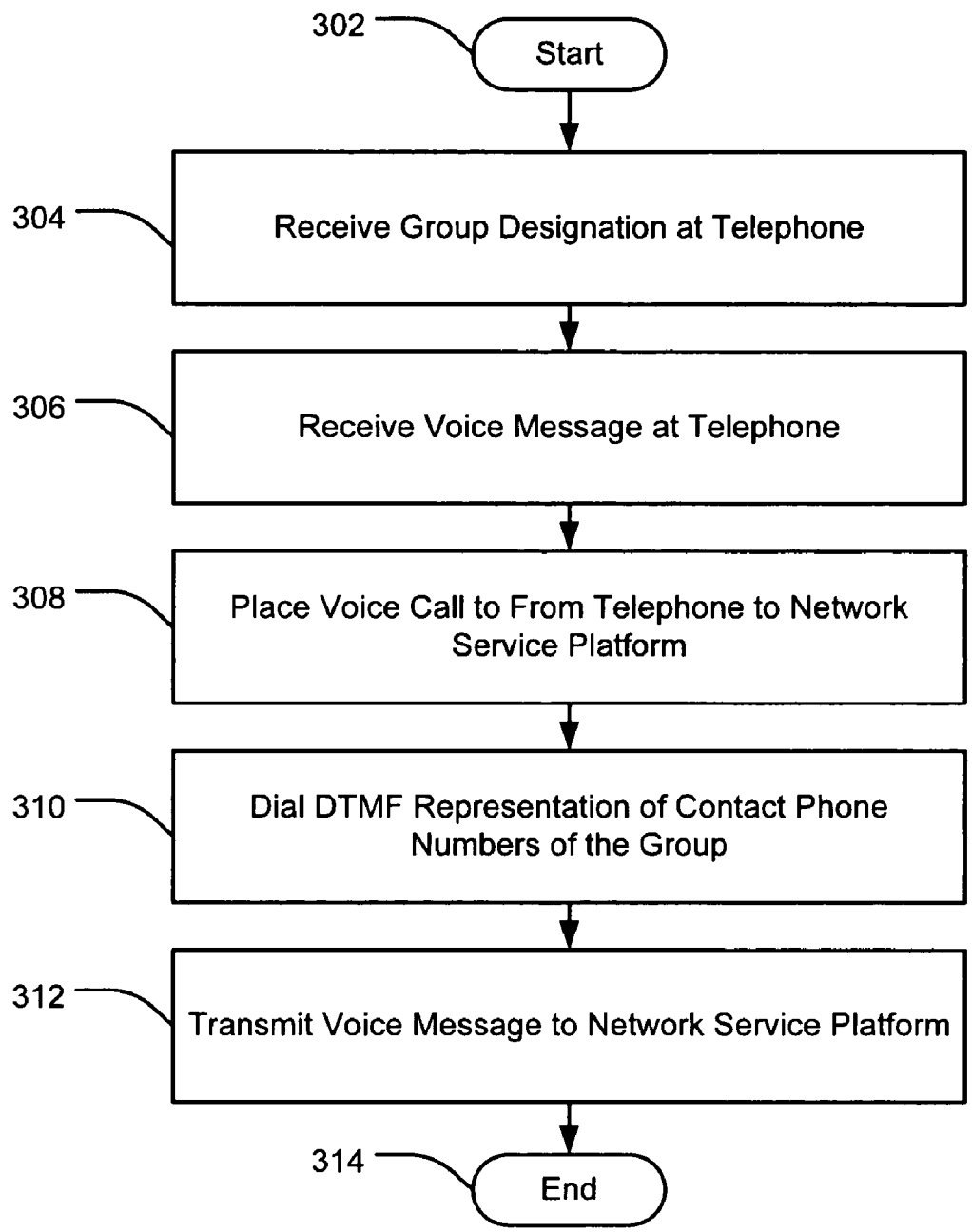
FIG. 5 is a process flow diagram showing operation a telephone in accordance with an embodiment of the invention.

FIG. 5 discloses a process flow at an exemplary telephone embodiment. The flow begins at step 302. The start may be triggered by, for example, a user selecting a messaging option on the telephone. Other triggers are available. At step 304, the telephone receives a user designation of a group of contact numbers. In the exemplary embodiment, the group designation is provided through a user I/O. In a further embodiment, the user selects a group designation from a list provided on the telephone or from an IM "buddy group." According to the embodiment, the group designation is used to determine which contacts will receive a voice message from the system. In a further embodiment, the buddy group consists only of contact numbers representing users who are currently on-line.

At step 306, the telephone receives a voice message. The voice message may also be provided through the user I/O. As an example of providing the voice message, a user may speak the message into an audio transducer of the telephone. Alternatively, the voice message may be already stored in data storage on the telephone. Likewise, the voice message may be downloaded or otherwise received from a second communications device. This may include e-mailing, forwarding, beaming, downloading, streaming, etc. Thus, the voice message may be received as a binary file, binary stream, or an analog stream.

The telephone places a voice call to a network service platform (NSP) at step 308. According to the exemplary embodiment, the telephone has an NSP contact number stored in data storage and is configured to dial the NSP contact number as part of a group voice messaging application. Other methods for opening a voice call are available. For example, a message may be delivered to a telephone network requesting a connection.

Once a voice call is established between the telephone and the NSP, a DTMF signal is transmitted over the telephone line at step 310. According to the exemplary embodiment, the DTMF signal is a representation of a contact number of the group designated at step 304. According to one embodiment, the contact numbers are telephone numbers of the contacts in the designated group. Alternatively, the contact numbers may be network access identifiers, or another indication of a delivery address. Likewise, the contact numbers within the group may have assorted types. In another embodiment, a DTMF code or other code may be used to identify the type of contact number.

According to an embodiment, only numerals along with a pound sign (#) and an asterisk (*) are transmitted as DTMF signals. More generally, for another embodiment, a DTMF mapping may be created for many characters. Thus, according to an embodiment, any ASCII character may be mapped to a DTFM signal. For example, U.S. Pat. No. 6,728,934 provides a table for transforming DTMF signals into ASCII characters. U.S. Pat. No. 6,728,934 is hereby incorporated by reference. Additionally, a DTMF code or other code may be transmitted at the start of the voice call to identify the voice call as a voice messaging call. According to yet another embodiment, the DTMF signal is an indication of the contact numbers that may be translated into a set of contact numbers at the NSP using a reference table or other lookup mechanism.

At step 312, the voice message is transmitted from the telephone to the NSP. The transmittal may, for example, be accomplished by "playing" the message over the voice connection. Alternatively, the voice message may be transmitted over the voice call to the NSP as it is delivered to the telephone through the user I/O.

According to an embodiment, during both steps 310 and 312, a user may hear audible transmissions as they are sent from the telephone. However, in an alternative embodiment, these sounds are masked or muted in some embodiments so that the user does not hear the transmissions. Masking or Muting may include, for example, altering speaker volume; changing a sound signal path; or through other software or hardware implementation. Further, the telephone may provide other indication of the transmissions, such as a beep, flashing light or other display. Likewise, a user I/O signal may indicate the completion of the transmission(s).

Although FIG. 5 shows steps in a particular sequence, these steps may be placed in alternate order. The voice message may be received before selecting the group. Alternatively, the voice message may be received after placing the voice call. Additionally, the DTMF signal may be sent subsequent to transmission of the voice message. Other steps, including delays, may be included between the steps shown in the process flows.

Figure 6:
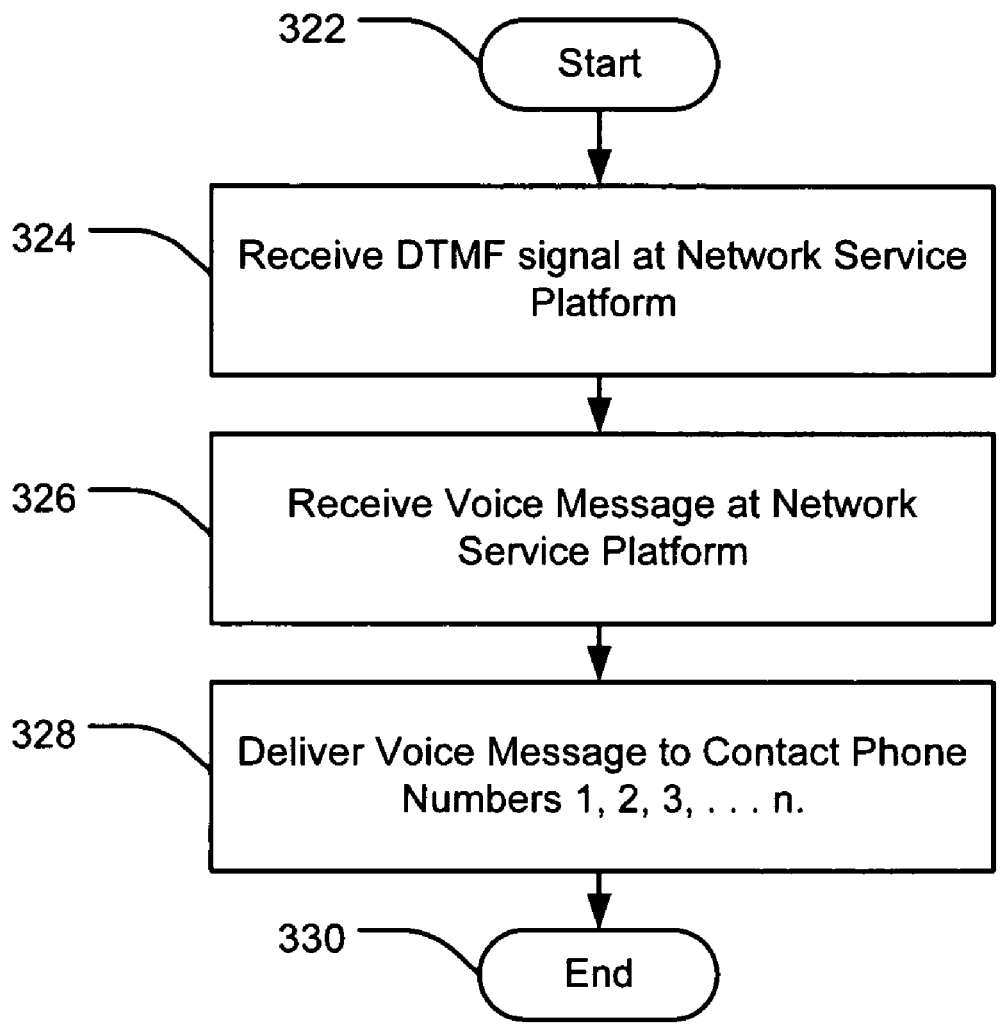
FIG. 6 is a process flow diagram showing operation of a network service platform in accordance with an embodiment of the invention.

FIG. 6 discloses a process flow at a network service platform (NSP). The process flow diagram begins at step 322. The start may be triggered by receiving a voice call from a telephone, for example. Alternatively, the start may be triggered by opening a voice call connection with a telephone. Further, the start may be triggered by a DTMF code or other tonal code received at the NSP over the voice call.

At step 324, the NSP receives a DTMF signal from the telephone over the voice call. According to an embodiment, the DTMF signal is a representation of a set of contact numbers as described above. In an embodiment, the NSP (or other entity) decodes the DTMF signal into the various contact numbers. These may be stored in data storage at the NSP.

At step 326, the NSP receives a voice message from the telephone over the voice call. As one skilled in the art will recognize, the order of steps 324 and 326 may be reversed. Although termed a "voice" message, the message is more generally an audible message. Thus the message may be a DTMF code, music, voice, or other signal. In an embodiment, the voice message is stored in data storage at the NSP.

At step 328, the NSP delivers a voice message to each of the contact numbers represented by the DTMF signal. As shown in the drawing, many contact numbers may be dialed. These contact numbers may, for example be telephone numbers—thus delivering the voice message may include opening a voice call to the telephone addressed by the telephone number and playing the voice message over the voice call. Alternatively, if a contact number is a SIP address, a connection may be established with the device addressed by the SIP address, and the voice message streamed to the device. Alternatively, depending upon the address type, the message may be delivered as a binary file, or a message may be delivered indicating that a message is available at a server or other location. Thus, in an embodiment, each contact number may be processed differently depending upon its type. At step 330, the disclosed process flow ends.

Figure 7:
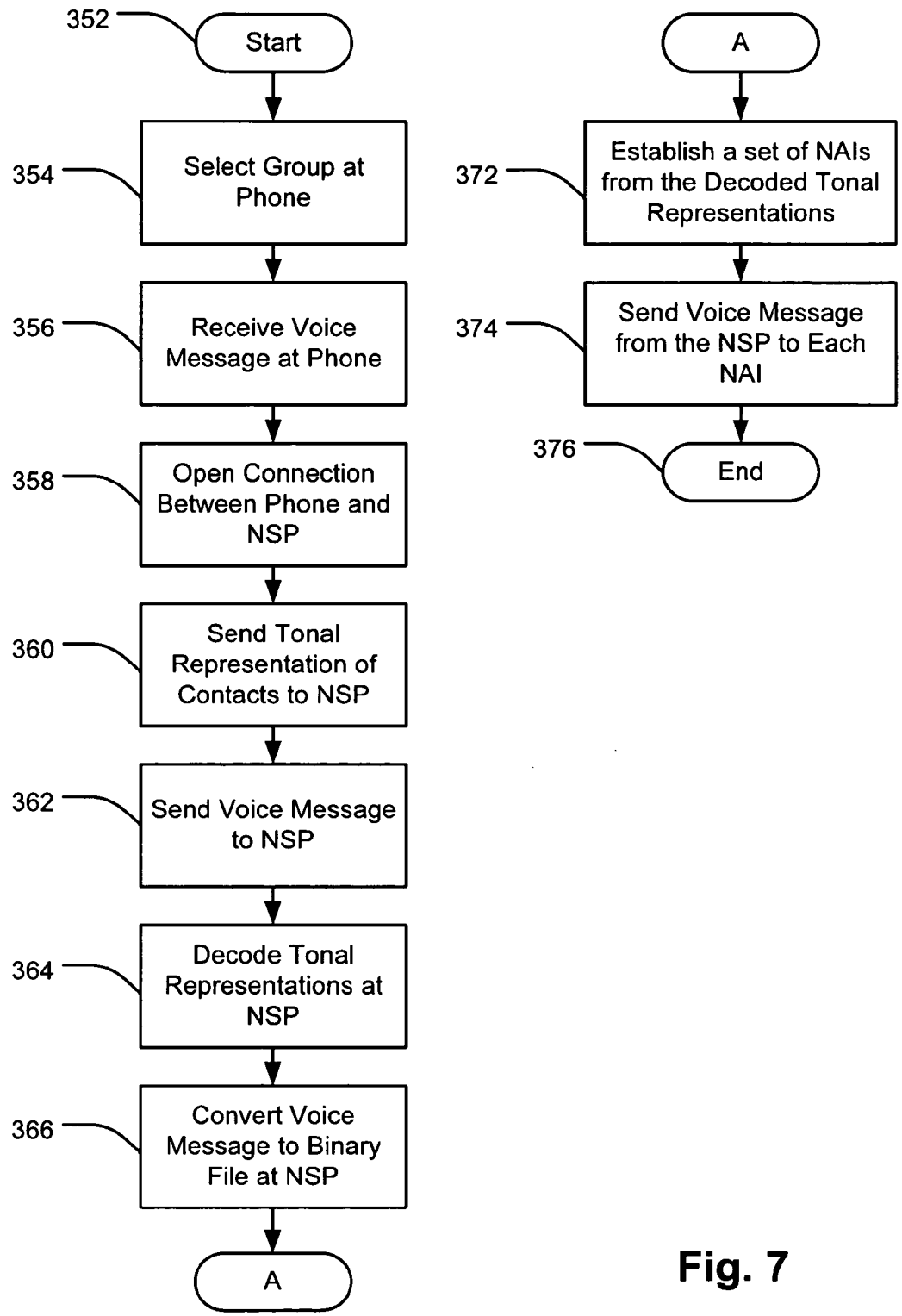
FIG. 7 is a process flow diagram showing operation a voice messaging system in accordance with an embodiment of the invention.

FIG. 7 discloses another process flow showing operation of an embodiment. The process flow starts at step 352. At step 354, a group of contacts is selected at a telephone. Potentially, the group selection may be directed by a user of the telephone or otherwise. At step 356, a voice message is received at the telephone. At step 358, a connection is opened between the telephone and a network service platform (NSP). This connection may, for example, be a voice call. At step 360, tonal representations of the contacts in the group are sent over the voice call from the telephone to the NSP. These tonal representations may be a DTMF signal or other signal sent over the voice call.

At step 362, the voice message is sent over the voice call from the telephone to the NSP. According to an embodiment, the voice message had been stored in data storage on the telephone or in another location. In this embodiment, the voice message is "played" over the voice call. In another embodiment, Step 362 occurs substantially simultaneously with step 356. Thus, the voice message may be received at the telephone and transmitted over the voice call to the NSP without being stored in data storage on the telephone. Alternatively, a temporary storage may store all or part of the voice message. According to an embodiment, the temporary storage would be deleted immediately following transmission of all or part of the stored voice message.

After receiving the tonal representations of the contact numbers, the NSP decodes the tonal representations into computer readable representations of the signal 364. For example, the signal could then be stored as ASCII or other characters in a database or file. At step 366, the voice messages are converted to a binary file at the NSP. This file may be a .wav file or other file type. This conversion is not, however, required in all embodiments.

At step 372, the decoded tonal representations are converted into a set of network access identifiers (NAI's). An NAI may, for example be a telephone number, an e-mail address, an instant messaging contact number or buddy number, a SIP contact number, a pager number, or other network contact information. In an embodiment, the decoded tonal representations also include an indication of the type of the NAI. The NAI's may be stored in data storage on the NSP.

At step 374, the voice message is sent from the NSP to each NAI. If the NAI is a more traditional telephone number, then step 374 may include opening a voice connection with the telephone represented by the NAI telephone number, and playing the voice message over the voice connection. If a messaging service answers the telephone then the NSP may be configured to leave the message after a tone or similar indication. According to several embodiments, the telephone could be any type of telephone including landline, cordless, wireless, VOIP, SIP, or TTY, for example.

If the NAI is being sent to an e-mail address or an IM address, the procedure may be modified to attach the binary file holding the voice message to a message sent to the NAI across a packet data network. Thus, a user may receive an e-mail containing an attached voice message or voice-mail. Alternatively, a message may be sent to a receiving user indicating that a voice message is available for download or delivery. Message retrieval may be accomplished through several methods including downloading the voice message through an interne website; requesting delivery of the voice message to an address or telephone number; or requesting the voice message be delivered as an MMS message, for example. Alternatively, the system may allow a user to call-in to listen to messages or may push the message to the user. The process flow ends at step 376.

Figure 8:
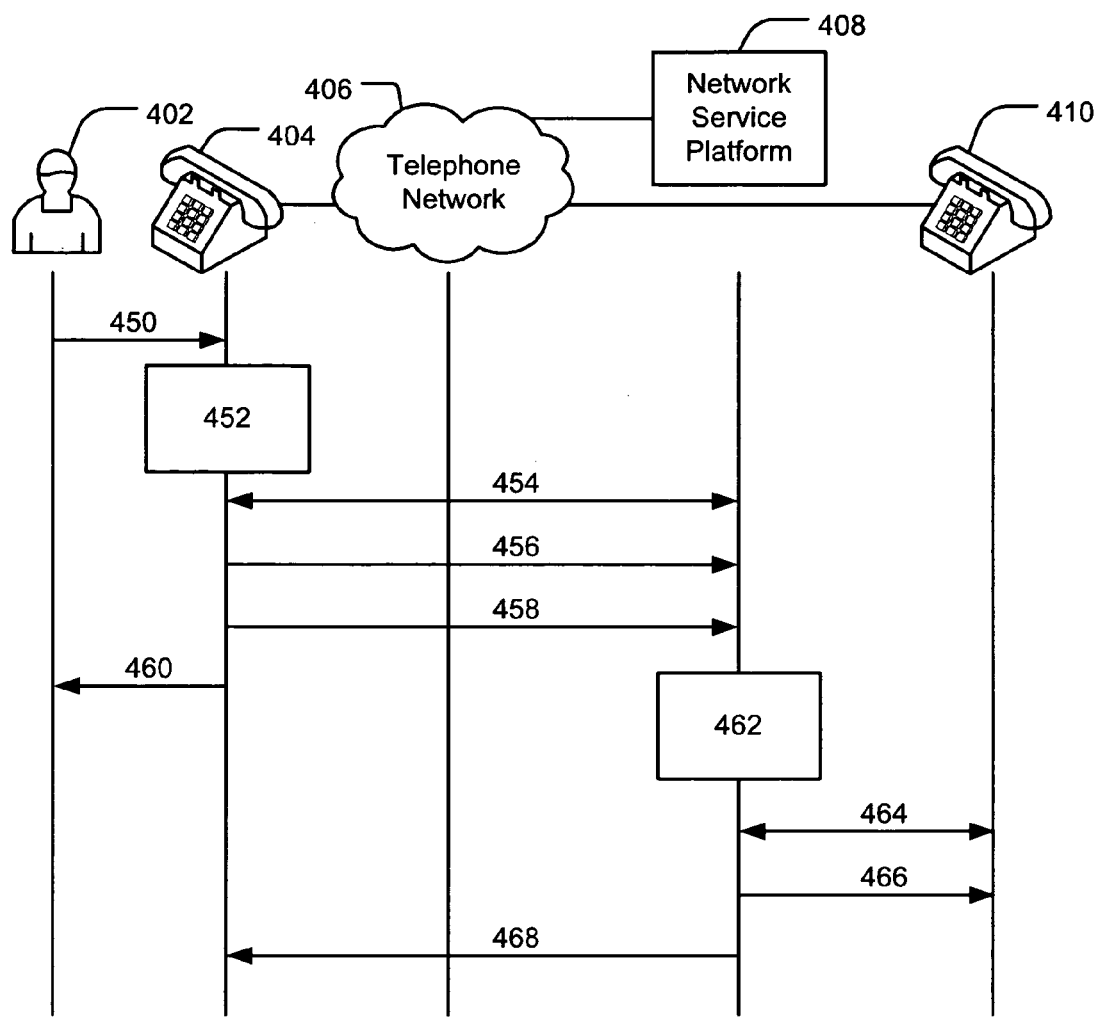
FIG. 8 is a messaging diagram showing communications between elements of an embodiment of the invention.
Figure 9:
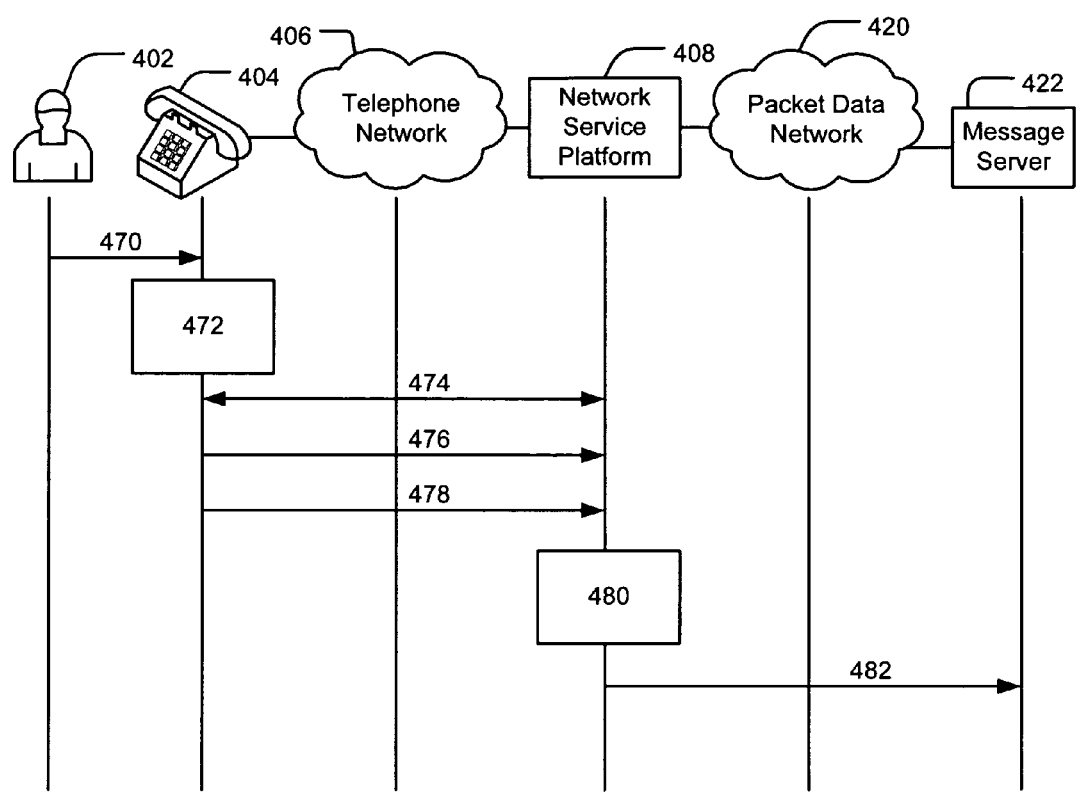
FIG. 9 is a messaging diagram showing communications between elements of another embodiment.

Communication flow diagrams are also provided in FIGS. 8 and 9. In FIG. 8, a user 402 is able to communicate through a sending telephone 404 that is communicatively coupled with a telephone network, such as a PSTN or a wireless network. The sending telephone may, for example, be a mobile telephone (wireless), landline, VOW, etc.

A network service platform 408 is coupled with the telephone network 406 and may be, for example, a server or distributed set of communication devices such as computers or enabled switches. The connection between the network service platform 408 and the telephone network 406 is preferably configured so that a voice call can be placed from the sending telephone 4040 to the network service platform 408 through the telephone network. A receiving telephone 410 is also coupled with the telephone network and is configured to receive a voice call.

Looking now at the messaging flow shown in FIG. 8: at step 450, the user 402 provides information to and requests action from the sending telephone 404. This may include triggering a voice messaging application on the sending telephone 404, selecting a group of contact numbers from a list stored on the sending telephone 404, and speaking a voice message into the sending telephone 404 or selecting a voice message to send from a set of stored voice messages. At step 452, the sending telephone may store the group selection and the voice message in data storage on the sending telephone 404, encode contact numbers in the selected group as DTMF signals, and trigger a voice message sending procedure, for example. Other actions may also be available.

At step 454, the sending telephone 404 establishes a connection (voice call) with the network service platform 408. The DTMF signal and voice message are sent to the network service platform 408 at steps 456 and 458 respectively. According to an embodiment, after transmitting the message to the network service platform 408, the sending telephone 404 notifies the user 402 that the message has been sent at step 460.

At step 462, the network service platform 408 decodes the DTMF signal into a set of contact numbers. A connection is opened between the network service platform 408 and a receiving telephone 410 through the telephone network 406 at step 464. The receiving telephone 410 is associated with one of the contact numbers. Once the call is established at step 464, the voice message is transmitted over the call to the receiving telephone 410 at step 466.

According to some embodiments, at step 468, a notification of delivery is sent from the network service platform 408 to the sending telephone 404.

Another message flow is disclosed in FIG. 9. The disclosure of FIG. 9 may be more applicable to delivery of messages to non-traditional voice services such as voice IM, e-mail, or other services that receive packet data rather than simply transduced voice signals. A user 404 controls a sending telephone 404 that is coupled with a telephone network 406. A network service platform (NSP) 408 is also coupled with the telephone network 406 as well as with a packet data network 420. A message server 422 is in communication with the packet data network 420.

In the process flow, the user 402 provides the sending telephone 404 with a group selection as well as a voice message at step 470. The sending telephone 404 then retrieves network access identifier (NAI) information for each contact in the group from data storage and converts the NAI information into a DTMF signal at step 472. At step 474, a connection is established over the telephone network 406 between the sending telephone 404 and the NSP 408 through the telephone network 406. The sending telephone 404 transmits the DTMF signal at step 476 and voice message at step 478. According to some embodiments the voice message may be sent in a more compressed format in order to speed transmission or for other purposes.

At step 480, the NSP 408 may decode the DTMF signal; establish a set of NAI based on the decoded DTMF signal; store the voice message in data storage; and prepare to deliver the voice message to each NAI.

At step 482, the NSP 408 sends a message through the packet data network 420 to the message server 422. According to some embodiments, the message includes the voice message as an attached or enclosed file. Alternatively, the message simply includes an indication that a message is available for a user. In a further embodiment, the voice message is converted into written text and the text sent as part of the message.

5. Conclusions

A variety of embodiments have been described above. More generally, those skilled in the art will understand that changes and modifications may be made to these embodiments without departing from the true scope and spirit of the present invention, which is defined by the claims. For example, elements may be added or removed from the system architecture without eliminating usefulness of the embodiments. Elements described as hardware may be implemented as software or firmware. Likewise, elements described as software may be implemented as firmware or hardware. Although the disclosures discuss a voice call and a voice message, this terminology should not be seen to limit the calls or messages to only signals that represent human voices. A voice message may be any signal that is capable of being transmitted across a voice call. In order to maintain a manageable disclosure, elements in some embodiments were not repeatedly described although they may be implemented in other embodiments. Likewise, background elements that are well known to those skilled in the art were not further described although they may be a part of any of the embodiments.

We claim:

1. A method of delivering a voice message from a telephone to a group of recipients, the method comprising:
   receiving into the telephone a user designation of a group of contact telephone numbers;
   receiving into the telephone a voice message spoken by a user of the telephone;
   operating application logic on the telephone to place a voice call to a network service platform and, after the network service platform answers the voice call, to automatically dial DTMF representations of the contact telephone numbers in the group, so as to convey the contact telephone numbers to the network service platform;
   masking sound of the DTMF representations as they are dialed, so that the user of the telephone cannot hear the DTMF representations being dialed;
   during the dialing of the DTMF representations, presenting a status message to the user of the telephone indicating that the telephone is attempting to deliver the voice message; and
   transmitting the spoken voice message from the telephone to the network service platform, for delivery of the spoken voice message by the network service platform to recipients at the contact telephone numbers;
   receiving the DTMF representations of the contact telephone numbers at the network service platform;
   receiving the spoken voice message at the network service platform; and
   delivering the spoken voice message from the network service platform to recipients at the contact telephone numbers, wherein delivering the spoken voice message from the network service platform to recipients at the contact telephone numbers comprises converting the contact telephone numbers into contact addresses and delivering a recording of the spoken voice message to each contact address, wherein the contact addresses comprise Session Initiation Protocol (SIP) addresses.

2. The method of claim 1, wherein delivering the spoken voice message from the network service platform to recipients at the contact telephone numbers comprises:
   placing telephone calls from the network service platform to the contact telephone numbers indicated by the DTMF representations, and, when each telephone call is answered, playing the spoken voice message in the telephone call.

3. A method of delivering a voice message from a telephone to a group of recipients, the method comprising:
   receiving into the telephone a user designation of a group of contact telephone numbers;
   receiving into the telephone a voice message spoken by a user of the telephone;
   operating application logic on the telephone to place a voice call to a network service platform and, after the network service platform answers the voice call, to automatically dial DTMF representations of the contact telephone numbers in the group, so as to convey the contact telephone numbers to the network service platform;
   masking sound of the DTMF representations as they are dialed, so that the user of the telephone cannot hear the DTMF representations being dialed;

during the dialing of the DTMF representations, presenting a status message to the user of the telephone indicating that the telephone is attempting to deliver the voice message; and transmitting the spoken voice message from the telephone to the network service platform, for delivery of the spoken voice message by the network service platform to recipients at the contact telephone numbers;

receiving the DTMF representations of the contact telephone numbers at the network service platform;

receiving the spoken voice message at the network service platform; and delivering the spoken voice message from the network service platform to recipients at the contact telephone numbers, wherein delivering the spoken voice message from the network service platform to recipients at the contact telephone numbers comprises converting the contact telephone numbers into contact addresses and delivering a recording of the spoken voice message to each contact address, wherein the contact addresses comprise e-mail addresses.

4. The method of claim 3, wherein delivering the spoken voice message from the network service platform to recipients at the contact telephone numbers comprises:

placing telephone calls from the network service platform to the contact telephone numbers indicated by the DTMF representations, and, when each telephone call is answered, playing the spoken voice message in the telephone call.

\* \* \* \* \*